United States Patent [19]

Emery

[11] 4,067,826

[45] Jan. 10, 1978

[54] RECOVERY OF MIXED PLASTIC MATERIALS

[76] Inventor: Guy Emery, Radepont par Fleury-sur-Andelle 27380, France

[21] Appl. No.: 602,016

[22] Filed: Aug. 5, 1975

[51] Int. Cl.$^2$ .................................... B29H 19/00
[52] U.S. Cl. .............................. 260/2.3; 260/2.5 P; 260/42.47; 260/45.7 R; 260/45.8 N; 260/67 S; 260/120; 260/897 C; 264/37; 264/40.4; 264/54; 264/122; 264/140; 264/DIG. 69
[58] Field of Search ............... 264/DIG. 69, 40.4, 54, 264/37, 109, 128, 122, 140, 141, 176 R; 260/45.7 R, 67 S, 119, 120, 2.5 P, 45.8 N, 42.47, 897 C

[56] References Cited

U.S. PATENT DOCUMENTS

| | | | |
|---|---|---|---|
| 2,433,727 | 12/1947 | Arnold | 264/DIG. 69 |
| 2,878,221 | 3/1959 | Jenkins et al. | 260/45.7 R |
| 3,257,081 | 6/1966 | Brown et al. | 241/25 |
| 3,271,482 | 9/1966 | Harada et al. | 264/37 |
| 3,335,966 | 8/1967 | Haveman | 241/14 |
| 3,535,408 | 10/1970 | Ronden | 264/37 |
| 3,671,615 | 6/1972 | Price | 264/122 |
| 3,687,873 | 8/1972 | Kropscott et al. | 260/2.3 |
| 3,736,221 | 5/1973 | Evers et al. | 264/128 |
| 3,795,633 | 3/1974 | Golovoy et al. | 264/37 |
| 3,801,693 | 4/1974 | Stallings et al. | 264/331 |
| 3,806,562 | 4/1974 | Lamort et al. | 264/122 |
| 3,843,060 | 10/1974 | Colburn | 264/37 |
| 3,843,757 | 10/1974 | Ehrenfreund et al. | 264/176 R |

*Primary Examiner*—Jeffery R. Thurlow
*Attorney, Agent, or Firm*—Haseltine, Lake & Waters

[57] ABSTRACT

A process for recovering mixed plastic material including polyethylene and polyvinyl chloride wherein the material is ground, ballistically sorted and recovered while employing a regenerating master mix including rongalite and chlorinated polyethylene.

8 Claims, 6 Drawing Figures

RECOVERY OF MIXED PLASTIC MATERIALS

The present invention relates to a process and plant for recovering mixed plastic materials of any origin, particularly those obtained from household refuse collecting, and for treating them to produce original materials which may be used in various industries, such as the building industry.

At present, plastic materials are used in many fields as a substitute for classical materials such as wood and glass, and in particular in the wrapping and packaging field where they have reached a certain position of prominence.

Although the use of these plastic materials presents enormous advantages, it nevertheless has the great disadvantage of their difficulty of disposal after use. In this respect, the packages used, whether consisting of film or hollow casings, are mixed together in household refuse, and consist of polyvinyl chloride from wine, water, oil and vinegar bottles, polyethylene from films and milk bottles, polystyrene and stoppers, ABS (acrylonitrile butadiene styrene) from toys and other articles which retain residues of the products which they wrap or contain.

These plastic materials originate both from household refuse collected by municipalities, which then contain labels, thin aluminum caps, various dusts, textile fibres and a certain quantity of paper, cardboard and organic materials which may be mixed with them, and from industrial scrap from plastics processing industries.

The known and most useful means for disposing of plastic refuse are the following:

a. pure and simple dumping, which becomes intolerable for ecological reasons and because of the present shortage of all raw materials and their cost;

b. incineration, which is practised on large quantities and which at first sight seems an interesting solution.

Now it is quickly evident that considerable sums are necessary for maintaining incineration works owing to the rapid attack of metals by the hydrochloric acid given off during combustion of polyvinyl chloride, without taking any account of the very large investment which these incineration plants require. Furthermore these latter create atmospheric pollution due to the discharge to the atmosphere of very harmful gases such as hydrogen cyanide given off by the combustion of polyurethanes, hydrogen sulphide from sulphur products etc..., c. compost preparation, which is relatively costly and in which the plastic materials, which are inert as a vegetable nutritive, represent a useless and unwanted load.

Attempts have already been made to resolve these problems by certain processes which however require the previous sorting or washing of the plastic refuse.

In this respect, it is known to treat relatively homogeneous plastic refuse in which there is practically no polythene. The presence of polythene milk bottles in the refuse immediately causes stoppage of the process by burning due to the caramelization of the casein in the milk.

A further process is known which enables only actual industrial sorted refuse to be treated, in which its molding consists of simple hot compacting of the ground plastic refuse, which leads to very mediocre mechanical properties due to the heterogeneous nature.

An object of this invention is to remedy the disadvantages of known processes.

This is attained by a process for recovering mixed plastic materials of any origin, obtained in particular from the collection of household refuse, such as polyvinyl chloride, polyethylene, polystyrene, polypropylene and acrylonitrile butadiene styrene, and for treating them to obtain materials from them which may be used in various industries, wherein the aggregate of plastic materials is ground to form small dimension particles, the ground product thus obtained is mixed with a master mix prepared separately and comprising, amongst other things, constituents for neutralizing the hot glueing effect, causing a general degradation and due to the presence of polyethylene polluted with milk or any other similar product, and other constituents for obtaining a stable mixture of olefins and vinyls, the ground product with the master mix added is extruded, and the extrusion product is granulated or molded directly.

A plant embodying the invention is described below by way of example with reference to the accompanying drawings, in which.

Figure 1:
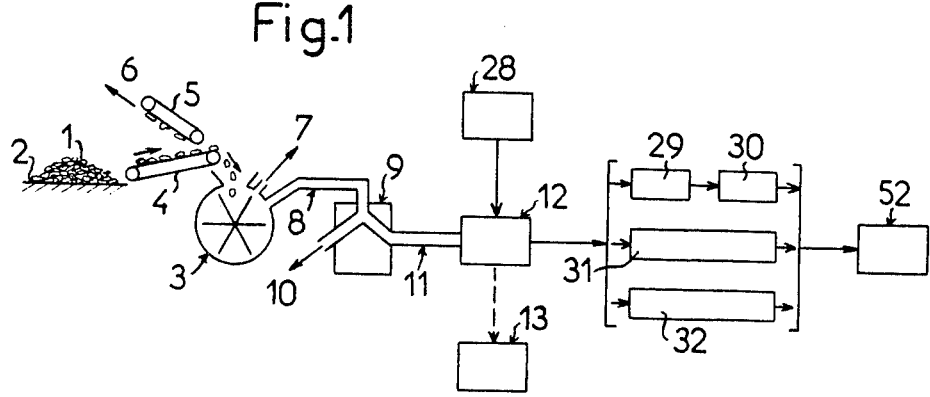
FIG. 1 is a diagram of the plant.

Referring to FIG. 1 plastic refuse 1, of any origin is collected on storage areas 2, from which it is conveyed to a mill 3 by way of conveyor belts 4 provided with an anti-grease coating. The refuse passes under an overband separator 5 which eliminates at 6 the majority of the metal pieces joined to the plastic refuse. The separator 5 operates magnetically and is based on the magnetic properties of ferrous material. The plastic refuse free from metal elements arrives at the mill 3 which is of the knife type or preferably of the ballistic type. The mill permits the elimination of all high density metal masses 7, which may have escaped the magnetism of the overband separator 5.

After grinding, the plastic particles are removed by a conveyor 8 which feeds them to a separator 9 where they pass into a magnetic field which eliminates the last ferrous or non-ferrous metal traces. These latter are shown discharging at 10.

The ground plastic particles, free from all metal traces, are then fed to a conveyor 11 to a mixer homogenizer 12 from which, after a certain time of mixing, samples are withdrawn which allow a rapid approximate evaluation to be made of the relative percentages of the different plastics materials in the successively treated batches. The composition of the batches should lie within a tolerance of ± 10% about a composition consisting of 75% of plastics material the majority of which has a specific gravity greater than 1, consisting of polyvinyl chlorides, and 25% of plastics material the majority of which has a specific gravity less than 1, consisting essentially of polyethylene.

Figure 2:
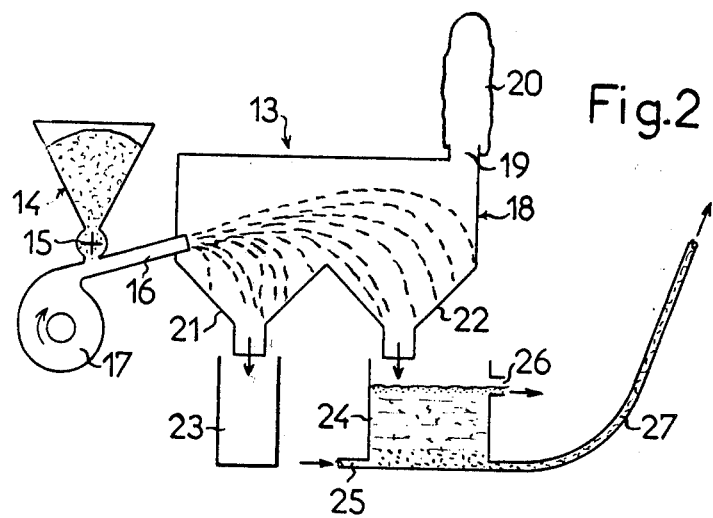
FIG. 2 is a diagram of a ballistic sorting apparatus forming part of the plant.

This rapid estimation may be made by a ballistic sorting apparatus indicated overall by 13, the arrangement of which is represented in detail in FIG. 2. As this figure shows, the apparatus comprises an inlet hopper 14 into which a certain quantity of ground charge originating from the mixer homogenizer 12 is introduced. At the bottom of the hopper 14 there is provided a distributor 15 which opens into the delivery duct 16 of a blower 17. The duct 16 opens in its turn into an enclosure 18 comprising a port 19 covered upperly by a ventilation cowl 20. The enclosure 18 comprises at its bottom two discharge hoppers, namely a hopper 21 close to the outlet opening of the duct 16 and a hopper 22 remote from the outlet opening of the duct 16.

In this manner, by the action of the air current blown by the blower 17, the duct 16 acts as a sort of projection cannon and produces a jet of air and entrained matter, of which the lighter matter (e.g. dust, paper and expanded polystyrene) falls into the hopper 21 and is collected at the outlet of this latter in a tank 23, and the heavier matter is projected towards the more distant hopper 22, into which it falls. Below this hopper there is a tank 24 containing water which is fed into the tank at its lower end at 25 and leaves through a port 26 at its upper end. The lower end of a tank is connected to a duct 27. In this manner, the plastic refuse having a specific gravity less than 1 floats on the surface of the water contained in the tank 24 and leaves through the port 26, while the plastic refuse of specific gravity greater than 1 falls to the bottom of the tank and is recovered from there through the duct 27, being entrained into this latter by the water current. In this manner, the plastic refuse of specific gravity less than unity is separated from the plastic refuse of specific gravity greater than unity. The refuse quantities thus separated may then be weighed to determine their relative proportions in the ground charge.

By means of this ballistic separation, an excessive variation in the ground plastic refuse percentages may be corrected by adding sharply classified industrial ground material to re-establish the equilibrium of the mix.

Parallel with the mixing operation taking place in the mixer homogenizer 12, a master regenerating mix is separately prepared, and of which the composition varies according to the characteristics of the final product which is to be obtained. This preparation, indicated diagrammatically at 28 in FIG. 1, may be carried out either in a slow mixer of the ribbon blender type, or in a fast mixer, or indeed in a plant for mixing by varying the speeds of screws or springs.

The master mix which is added to the ground charge must comprise rongalite (sodium formaldehyde sulphoxylate) acting as a caramelization inhibiter of the milk casein, as a replacement for formol which has the grave disadvantage of being lacrimatory. This inhibition may equally operate on products having a nature similar to casein. This inhibiting action is completed by the addition of a plasticizer. In effect, products of the milk or casein type enclosed in the polyethylene wrappers reinforce the glueing action of the polyethylene by caramelization followed by burning, which acts on the polyvinyl chloride to degrade it more rapidly, which obstructs the entire manufacture and recovery of the mixed plastics.

In the process according to the invention, the presence of the rongalite permits this recovery.

Furthermore, the rongalite presents certain disinfectant qualities. For 100 parts by weight of ground charge, approximately 0.1 to 5 parts by weight of rongalite are used. The master mix may also comprise stabilizers of the α-phenylindol type or any other suitable stabilizer to perfect the stabilization of the polyvinyl chlorides.

The master mix also contains multiple lubricants in the proportion of 0 to 5 parts by weight, to ensure both internal and external lubrication of the material.

To improve the mechanical qualities of the final object, shock resistant agents based on acrylic derivatives such as MABS (methyl acrylonitrile butadiene styrene), and ABS, etc. may be incorporated.

Numerous plasticizers and gelling agents possess the necessary qualities for reducing gelling times and improving the plasticity of the final material. Among these, one may mention as gelling agents the copolymers of polyvinyl chloride such as polyvinyl acetochloride, and as a primary plasticizer dioctyl phthalate, which assists a chlorinated paraffin which also confers good fire-resistant properties. Paraffin oil is also excellent in the case of compositions rich in polyethylene.

Certain plasticizers such as tricresyl phosphate may be used to reduce the viscosity of the material.

The regenerating master mix may also contain mineral fillers such as carbonates or silica, in proportions up to 800 parts by weight to 100 parts of the ground charge. The role of these fillers is to adsorb liquids present, reduce the final material cost and to give it excellent strength and wear properties to enable it to be successfully used in flagstones or any other ground covering.

The regenerating master mix may also incorporate various swelling agents such as azodicarbonamide which produces light expanded objects of cell structure, possessing both heat and sound insulation properties. In other respects, these expanded products have the same ease of working as wood. If plasticizers in large quantities together with elastomer powders are added, relatively supple expanded products may be obtained.

One of the essential points of the process according to the invention is the means for binding the polyvinyl chloride and the polyethylene. In effect, the addition of chlorinated polyethylene allows the polyethylene to dissolve to a certain extent in the polyvinyl chloride, thus producing a stable mix. The chlorinated polyethylene also improves the mechanical properties of the finished product. To further improve the properties of the finished material it is sometimes necessary to incorporate pure polyvinyl chloride in the master mix, to which one may add various fibres for improving its mechanical properties.

The regenerating master mix is present with the ground charge in the final mix in the proportion of 5 to 20 parts by weight to 100 parts of ground charge.

In the case of an essentially polyethylene based composition, it is advantageous to add low density polyethylene or one of the ethylene polymers such as vinyl acetate, EEA (ethylene-ethylacetate), EVA (ethylene-vinylacetate), the polyethylene or copolymers being a pure basic material. By varying the quality and quantity of the materials added to the ground charge, it is possible to obtain one of a relatively wide range of final polyethylene substitute products of different qualities. As a general rule, 1 to 20 parts, preferably 3 to 7 parts of this pure plastics material is added to 100 parts of ground charge. In the limit, especially when the quantity added is greater than 5 parts, it is advisable to mix a different quality of polyethylene, namely high density polyethylene, with the low density polyethylene.

A formulation for the composition of the regenerating master mix is given hereinafter,

| | |
|---|---|
| ground refuse charge | 100 parts by weight |
| rongalite | 0.1 to 5 parts |
| chlorinated polyethylene | 0 to 20 parts |
| polyvinyl chloride stabilizer | 0.1 to 5 parts |
| lubricant | 0 to 5 parts |
| expanding agent | 0 to 4 parts |
| shock resistant ABS | 0 to 12 parts |
| ground product of strictly defined nature (polyvinyl chloride or polyethylene) | 0 to 30 parts |
| filler | 0 to 800 parts |
| plasticizer | 0 to 70 parts |
| additional resin in the case of compositions mainly of polyethylene | 0 to 10 parts |
| fire-resistant product | 0 to 10 parts |
| colorant: according to the final result. | |

When the overall mixing of the ground charge and master regenerating mix has terminated in the mixer homogenizer 12, it is fed either to a drying apparatus 29 to totally or nearly totally eliminate the residual moisture to facilitate its passage through a subsequent extruder 30, or directly into a degassing extruder 31, or into a mixer-geller 32.

A description is given hereinafter with particular reference to FIG. 3 of a particularly advantageous ground charge drying apparatus. This apparatus comprises a hopper 33 into which the moist ground charge is fed and which opens lowerly into a horizontal stainless steel cylinder 31, which houses a coaxial worm 35 of progressive pitch. The worm 35 is rotated at variable speed by a variable speed motor assembly 36. The cylinder 34 is housed inside a heat insulating housing 37 and is surrounded at appropriate intervals by electrical heating elements 38. The cylinder 34 comprises ports on its upper side, through which the water vapour formed is discharged by suction. The end opposite the variable speed motor 36 is open for the exit of the dry ground charge.

Figure 3:
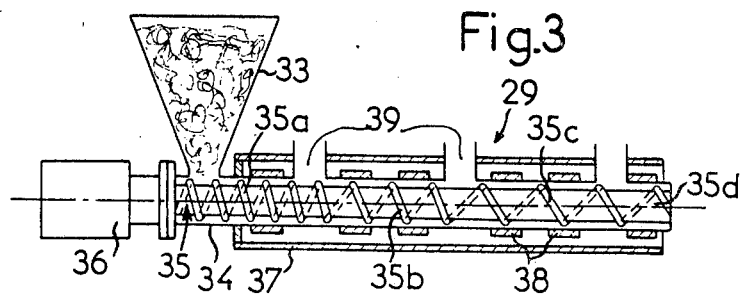
FIG. 3 is a vertical sectional diagrammatic view of an apparatus for drying a ground charge.

The worm 35 is formed from several portions of springs of different pitch, of which three are shown in FIG. 3, namely a first portion 35a of small pitch, a second portion 35b of a slightly larger pitch and a third portion 35c of a still larger pitch. The three portions are connected together one after the other and are fixed on to a central tubular shaft 35d. This arrangement has the advantage of being particularly economical and easy to construct.

When the electric motor 36 operates, the moist ground charge is moved inside the external cylinder 34 and is progressively dried during its movement.

Figure 4:
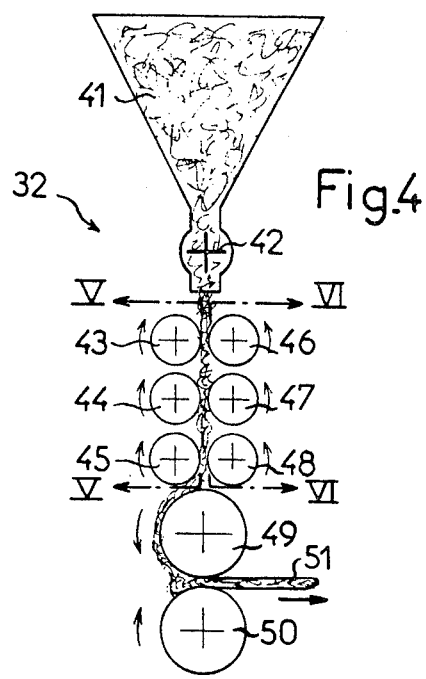
FIG. 4 is a vertical diagrammatic section through a mixer-geller.
Figure 5:
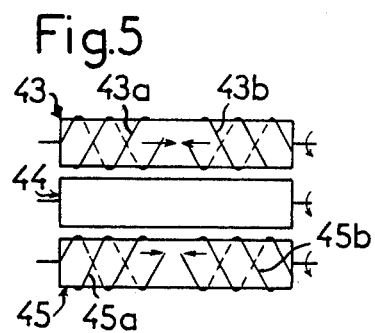
FIG. 5 is a partial vertical sectional view on the line V—V of FIG. 4.
Figure 6:
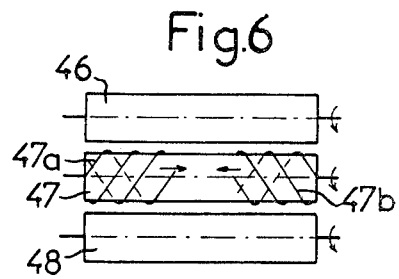
FIG. 6 is a partial vertical sectional view on the line VI—VI of FIG. 4.

As stated heretofore, the final global mix may also be fed into a mixer-geller 32 which is described hereinafter with particular reference to FIGS. 4 to 6.

The mixer-geller 32 comprises an upper hopper 41 into which the mix comprising the ground plastic material and the master regenerating mix is fed. The lower part of this hopper, which comprises a rotary valve 42, is situated above two vertically overlying horizontal roller assemblies, namely left hand rollers 43, 44, 45 and right hand rollers 46, 47, 48. The three left hand rollers 43, 44, 45 are rotated in the same direction namely the clockwise direction, while the three right hand rollers 46, 47, 48 are driven in the opposite direction. The upper left hand roller 43, the right hand intermediate roller 47 and the lower left hand roller 45 are provided with threads, namely 43a, 43b for the roller 43, 47a, 47b for the roller 47 and 45a, 45b for the roller 45. The two threads on each roller are of opposite pitch and are positioned in such a manner that the movement of rotation of the roller always tends to move the material towards the roller centre.

The other rollers disposed opposite the preceding, namely the upper right hand roller 46, the intermediate left hand roller 44 and the lower right hand roller 48, are smooth.

In this manner, as the material falls and passes between the horizontally opposing rollers of each pair, it is always mixed and moved towards the center, and is also gelled.

At the exit of the space lying between the two lower rollers 45, 48, the gelled and mixed material falls on to an upper horizontal roller 49 co-operating with a lower horizontal roller 50. These two rollers are rotated in opposite directions and the material which falls on to the upper roller 49 is rolled between the latter and the lower roller 50 and leaves it in the form of a homogeneous band 51. Preferably the fibrous fillers are added before the passage of the gelled material between the rollers 49 and 50, to avoid their destruction during mixing by the pairs of rollers 43/46, 44/47 and 45/48.

The material leaving the extruder 30, the degassing extruder 31 or the mixer-geller 32 is then subjected to a third mechanical processing stage indicated at 52 in FIG. 1, depending on the use envisaged. This stage may comprise a granulation, profiling or molding cycle.

A very resistant, smooth and brilliant surface may be obtained by the sandwich method in a molding cycle, by coating the mold walls with pure stabilized and possibly colored polyvinyl chloride powders by simple electrostatic deposition.

The material regenerated by the process according to the invention may also serve as a product directly usable in the building industry for flagstones, insulation panels and partitions, in the signalling industry, in joinery for planks, sections or constituent elements of furniture, and in the manufacture of general objects such as reels, pegs and blades.

In the case of a largely polyethylene based composition, the invention allows a product to be obtained which approaches the characteristics of a polyethylene of a determined grade.

What I claim is:

1. In a method for recovering mixed plastic materials from refuse selected from the group consisting at least of polyvinyl chloride and polyethylene, comprising grinding the mixture of plastic materials into small particles, extruding the ground mixture and granulating or molding the extruded material, the improvement comprising ballistically sorting the ground mixture in order to adjust the composition of the mixture and adding to 100 parts of said ground mixture a regenerating master mix comprising:

| | | |
|---|---|---|
| -rongalite | 0.1 to | 5 parts |
| [-chlorinated polyethylene | 0 to | 20 parts] |
| -polyvinyl chloride stabilizer | 0.1 to | 5 parts |
| -lubricant | 0 to | 5 parts |
| -expanding agent | 0 to | 4 parts |
| -shock resistant ABS or MABS | 0 to | 12 parts |
| -ground polyvinyl chloride or polyethylene | 0 to | 30 parts |
| -filler | 0 to | 800 parts |
| -plasticizer or gelling agent | 0 to | 70 parts | and an amount of chlorinated polyethylene sufficient to bind the polyethylene to the polyvinyl chloride comprising up to 20 parts per 100 parts of the ground mixture, wherein the rongalite prevents the hot glueing effect due to the presence of milk or similar products in said refuse.

2. The product prepared by the method of claim 1.

3. The product of claim 2 wherein the plasticizer is selected from the group consisting of polyvinyl acetochloride, dioctyl phthalate, chlorinated paraffins, and paraffin oil.

4. The product of claim 2 wherein the filler is selected from the group consisting of mineral carbonate fillers and silica.

5. The product of claim 2 wherein the master mix comprises 1 to 20 parts of a polymer selected from the group consisting of vinyl acetate, ethylene-ethyl acetate, and ethylene-vinyl acetate polymers.

6. The product of claim 2 wherein the vinyl chloride stabilizer is α-phenylindole.

7. A process for processing a mixture of plastic materials comprising polyethylene containing traces of milk and polyvinylchloride which comprises grinding said mixture; ballistically sorting the ground mixture in order to adjust the composition of the mixture adding to the ground mixture a master mix comprising 0.1 to 5 parts of rongalite per 100 parts of the ground mixture, an amount of chlorinated polyethylene sufficient to bind the polyethylene to the polyvinyl chloride comprising up to 20 parts per 100 parts of the ground mixture, 0.1 to 5 parts of a stabilizer for polyvinyl chloride and 0 to 5 parts of a lubricant; extruding the combined mix; and molding the extruded product, wherein the rongalite prevents caramelization of the milk during processing.

8. The product obtained by the process of claim 7.

* * * * *